US011491595B2

(12) United States Patent
Farrell

(10) Patent No.: US 11,491,595 B2
(45) Date of Patent: Nov. 8, 2022

(54) PICK TOOLING DEVICE FOR AUTOMATED FASTENING

(71) Applicant: Raytheon Company, Waltham, MA (US)

(72) Inventor: Justin V. Farrell, Stratham, NH (US)

(73) Assignee: Raytheon Company, Waltham, MA (US)

( * ) Notice: Subject to any disclaimer, the term of this patent is extended or adjusted under 35 U.S.C. 154(b) by 895 days.

(21) Appl. No.: 16/360,595

(22) Filed: Mar. 21, 2019

(65) Prior Publication Data

US 2020/0298357 A1    Sep. 24, 2020

(51) Int. Cl.
 *B23Q 3/155* (2006.01)
 *B23P 19/06* (2006.01)
 *B23Q 5/28* (2006.01)

(52) U.S. Cl.
 CPC ............ *B23Q 3/1556* (2013.01); *B23P 19/06* (2013.01); *B23Q 5/28* (2013.01)

(58) Field of Classification Search
 CPC ........... B23P 19/06; B23Q 5/22; B23Q 3/155; B25B 21/007
 USPC .......................................................... 81/430
 See application file for complete search history.

(56) References Cited

U.S. PATENT DOCUMENTS

| | | | |
|---|---|---|---|
| 3,583,451 A * | 6/1971 | Dixon | B23P 19/006 81/433 |
| 4,636,135 A | 1/1987 | Bancon | |
| 4,639,996 A | 2/1987 | Fullmer | |
| 4,922,436 A | 5/1990 | Dohm et al. | |
| 4,924,732 A | 5/1990 | Hoskins et al. | |
| 5,630,682 A | 5/1997 | Davey | |

(Continued)

FOREIGN PATENT DOCUMENTS

| | | |
|---|---|---|
| CN | 104875004 | 9/2015 |
| CN | 107081440 | 8/2017 |

(Continued)

OTHER PUBLICATIONS

Fixtured Screwdrivers SER / SEB distributed by Weber, available online Mar. 20, 2019. Retrieved from Internet, <URL: https://www.weberusa.com/fixtured-screwdriving-systems/fixtured-screwdrivers-ser-seb/>.

(Continued)

*Primary Examiner* — David B. Thomas
*Assistant Examiner* — Jonathan G Santiago Martinez
(74) *Attorney, Agent, or Firm* — Renner, Otto, Boisselle & Sklar, LLP

(57) ABSTRACT

A pick tooling device including a pick tool configured to pick up an object such as fastener, and a driver having a drive bit that is configured to drive the fastener. The pick tool may be a pneumatically-operable gripper tool that is used to pick up the fastener, or the pick tool may be a vacuum-operable pick tool that utilizes suction to pick up the fastener. The drive bit may be axially movable relative to the pick tool to engage and drive the fastener picked up by the pick tool. The device may include a tool changer having one side that is operably connected to the driver, and another side that is operably connected to a fastener-specific pick tool, in which the pick tool can be separated from the driver to permit quick-changeover to a different type of pick tool.

18 Claims, 8 Drawing Sheets

(56) References Cited

U.S. PATENT DOCUMENTS

| | | | |
|---|---|---|---|
| 6,247,387 B1 * | 6/2001 | Ketteringham | B23P 19/066 81/469 |
| 6,418,818 B1 * | 7/2002 | Tham | B25B 23/10 81/54 |
| 7,563,060 B2 | 7/2009 | Kesterson et al. | |
| 8,337,124 B2 | 12/2012 | Nguyen | |
| 8,939,341 B2 | 1/2015 | Pedicini et al. | |
| 9,737,979 B1 * | 8/2017 | Sungkhaphong | B25B 23/08 |
| 2007/0287127 A1 | 12/2007 | Schaffran et al. | |
| 2010/0326242 A1 | 12/2010 | Miyamoto | |

FOREIGN PATENT DOCUMENTS

| | | |
|---|---|---|
| DE | 10354651 | 12/2004 |
| EP | 0940230 | 9/1999 |
| JP | 61159339 | 7/1986 |
| JP | H06277961 A * | 4/1994 |
| JP | 06277961 | 10/1994 |
| SU | 564146 | 7/1977 |

OTHER PUBLICATIONS

Vacuum Accessories distributed by Mountz, available online Mar. 20, 2019. Retrieved from Internet, <URL: https://www.mountztorque.com/products/power-assembly-tools/vacuumaccessories>.

The X-MOD Fixtured Automatic Screwdriver Head distributed by Carlson, available online Mar. 20, 2019. Retrieved from Internet, <URL: http://www.carlsoneng.com/automatic-screwdriving/fixtured/x-mod/>.

International Search Report and Written Opinion for the corresponding International Application PCT/US2020/021332 dated Aug. 31, 2020.

* cited by examiner

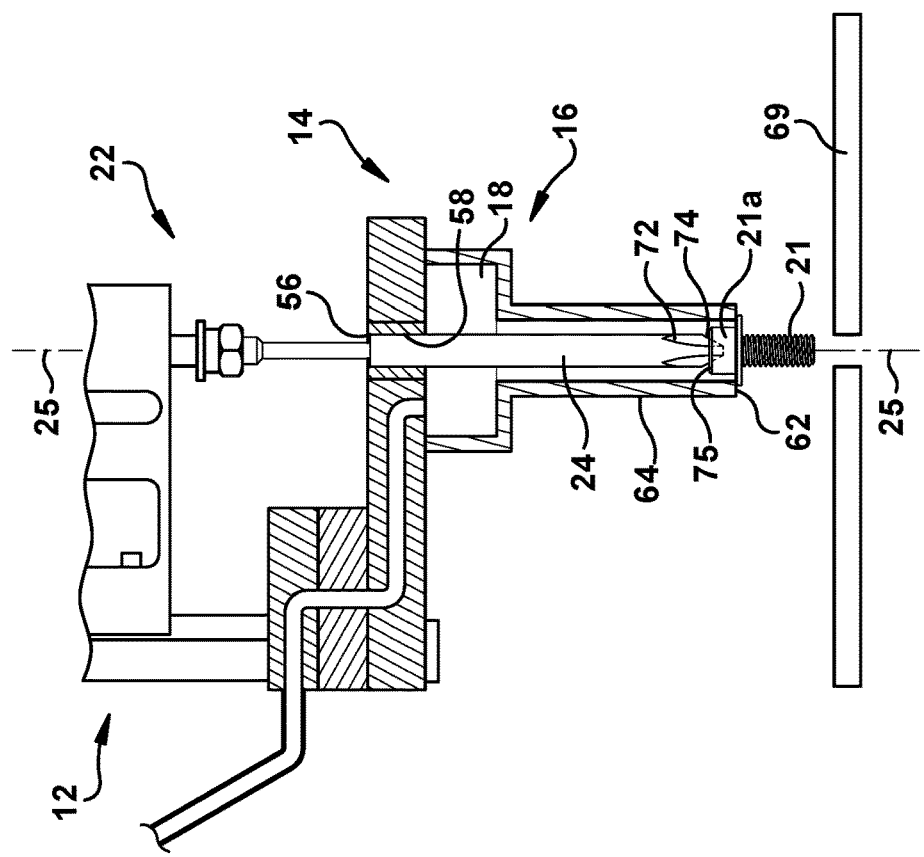
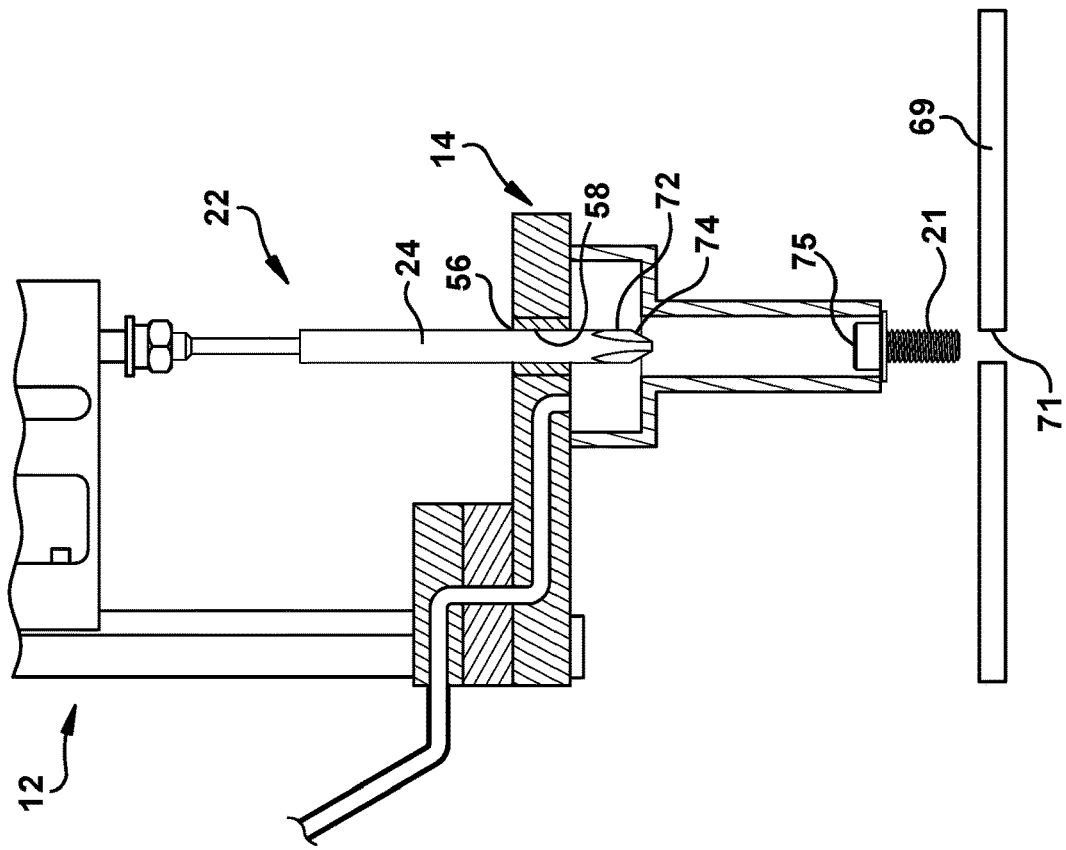

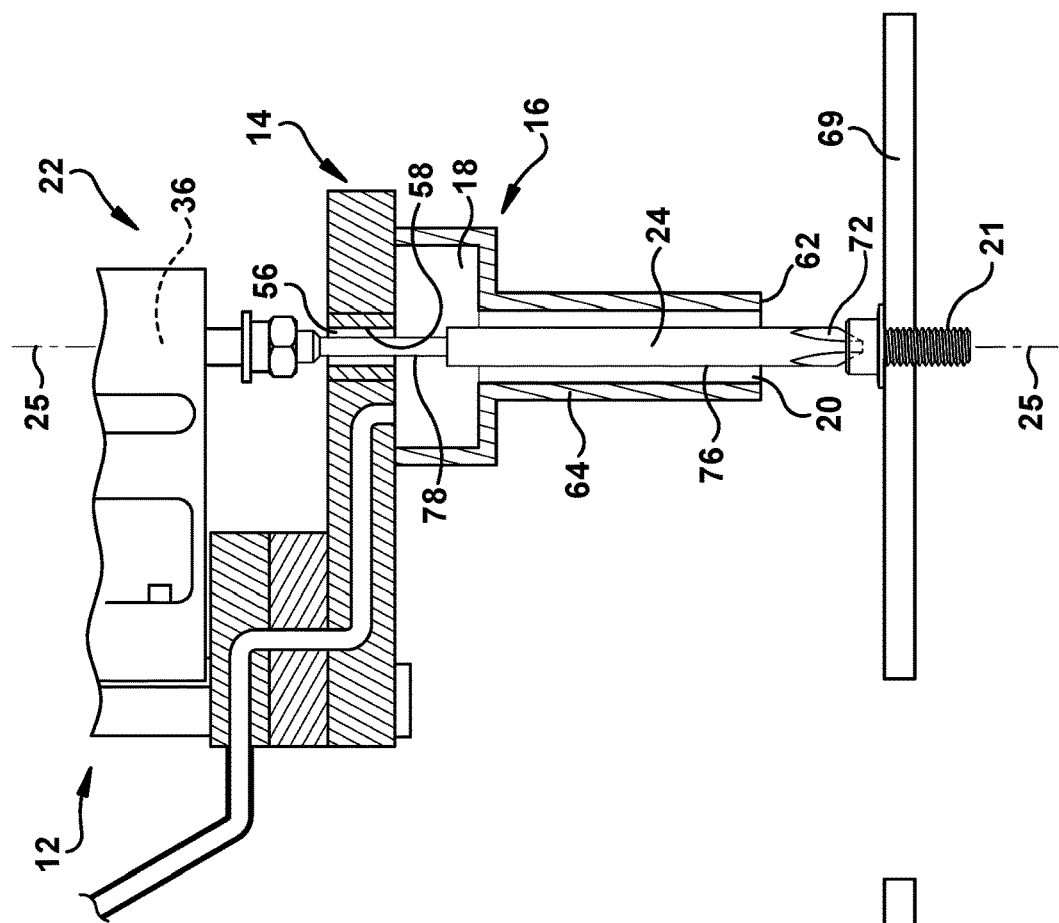
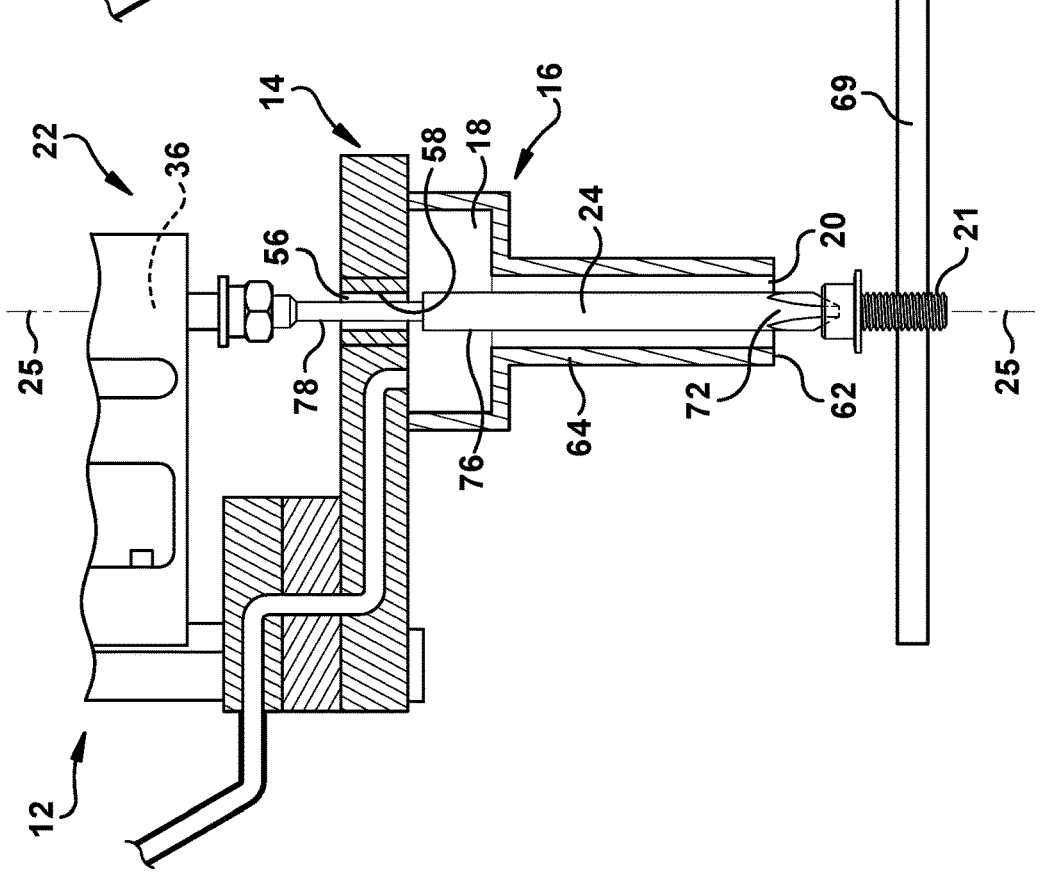

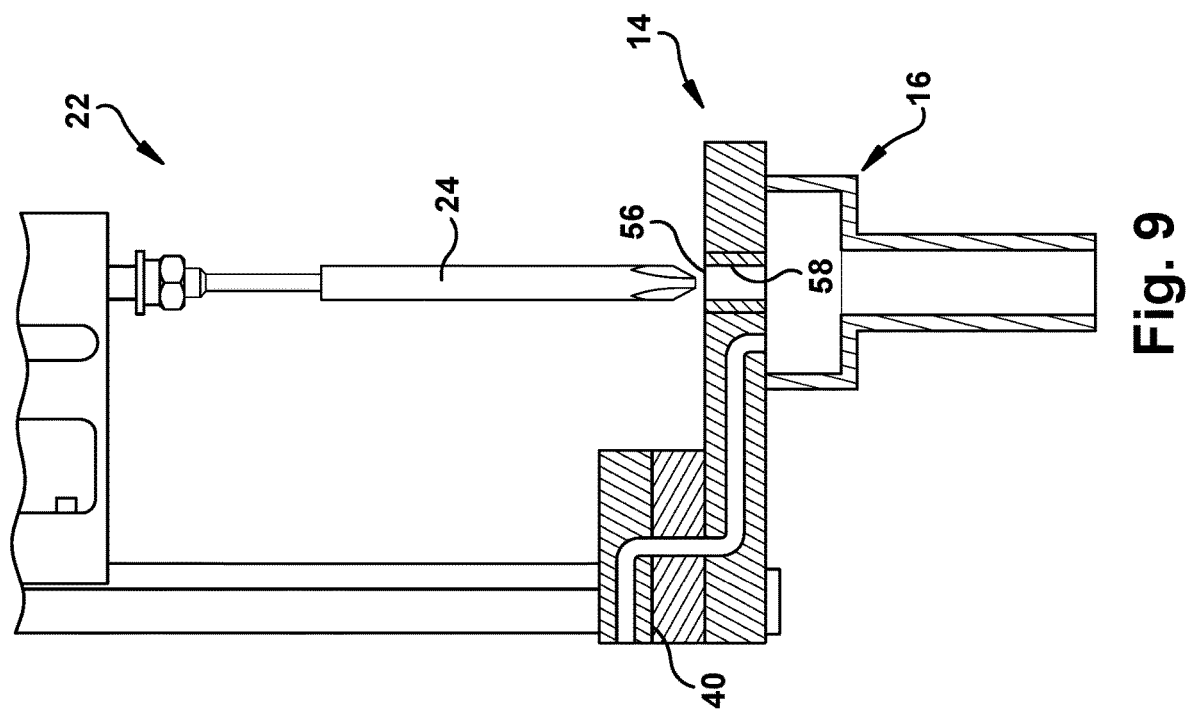
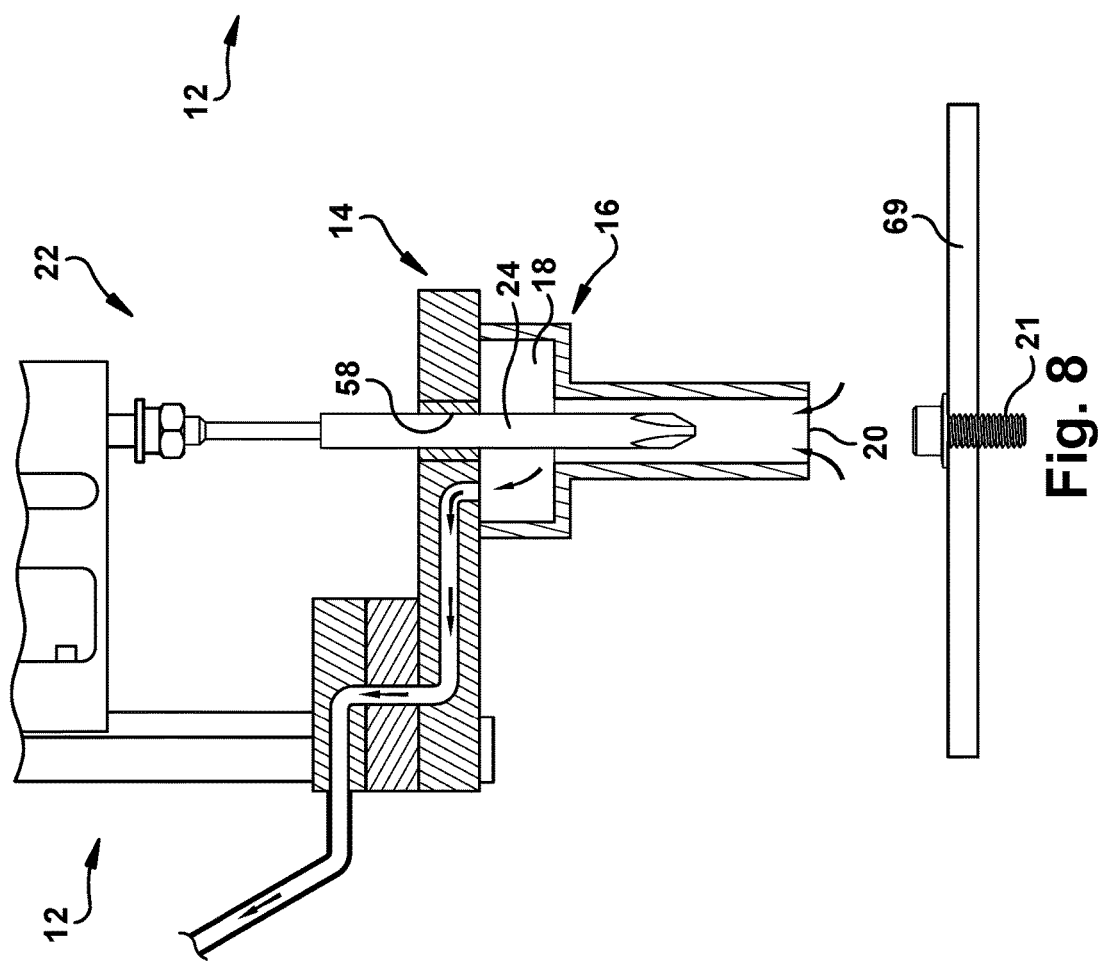
Fig. 8
Fig. 9

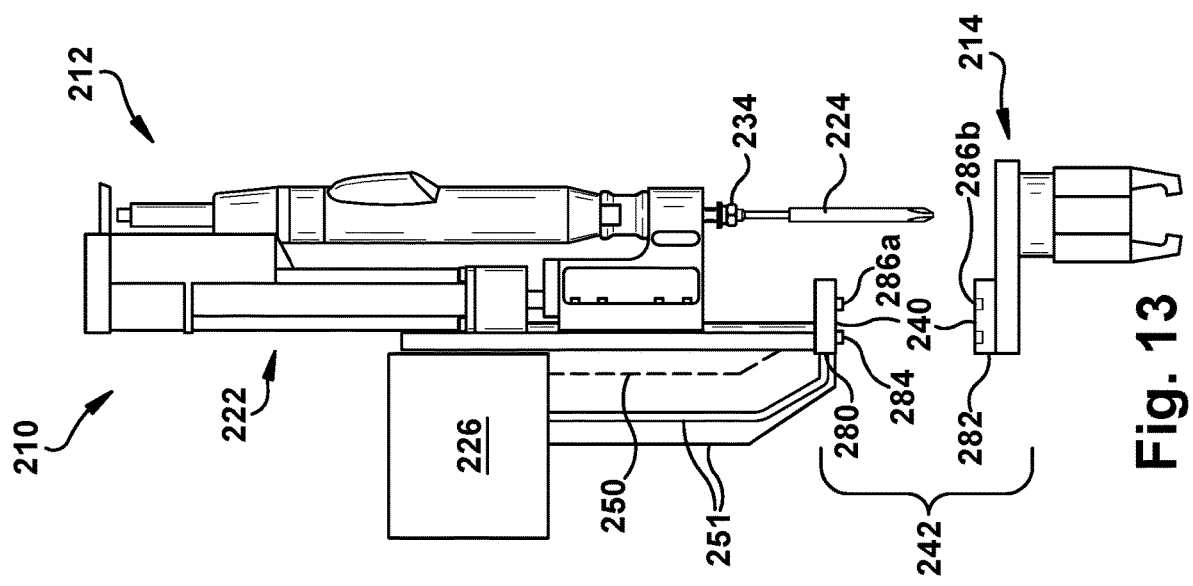
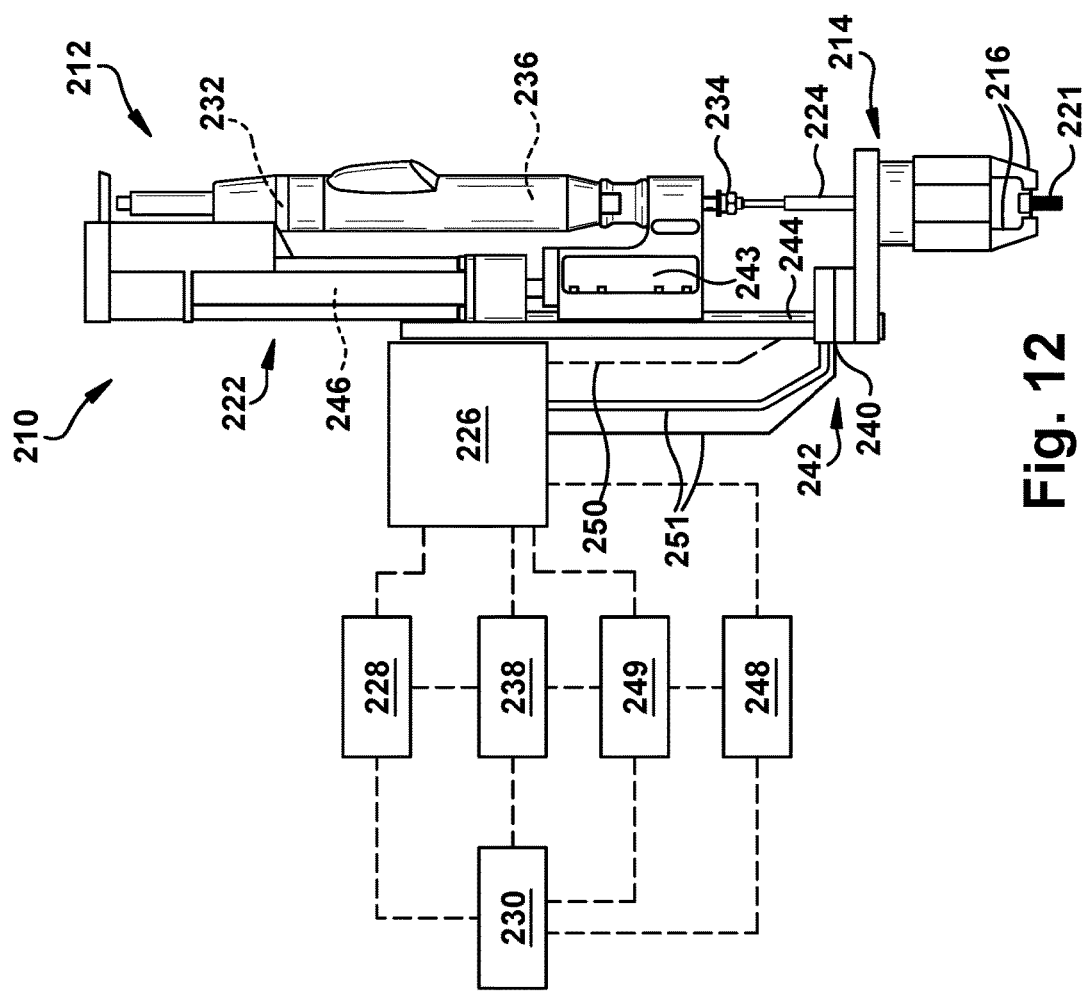

PICK TOOLING DEVICE FOR AUTOMATED FASTENING

TECHNICAL FIELD

The present invention relates generally to tooling, and more particularly to pick tooling with quick-changeover capability for use in automated fastening systems.

BACKGROUND

Pick tooling is often used in automation systems to pick up fasteners that are then used to fasten components together, for example. Conventional pick tooling devices include vacuum-assisted pick tooling and pneumatic-gripper pick tooling. Vacuum-assisted pick tooling typically uses suction at a nozzle end to pick up the fastener. Pneumatic-gripper pick tooling typically uses pneumatically operated gripper jaws to pick up the fastener. The pick tooling also may include a driver for driving the fastener. Such conventional pick tooling devices are typically hard-tooled to the specific fastener to be picked up and driven, which renders such conventional pick tooling inflexible due to the inability to quickly changeover for use with different fastener types.

SUMMARY

An aspect of the present invention provides a method and system that enables the pick up and driving of a wide range of fastener types by including a pick tooling device that can automatically and quickly be changed on-the-fly, such as during an assembly process.

More particularly, the pick tooling device may include a tool changer having one side that is operably connected to the driver, and another side that is operably connected to a fastener-specific pick tool, in which the pick tool can be separated from the driver to permit quick-changeover to a different type of pick tool.

When the pick tool is separated from the driver, a drive bit may remain operably coupled to the driver, thereby allowing the same drive bit to be utilized across different pick tools.

The pick tool may be a pneumatically-operable gripper tool that is used to pick up the fastener. Alternatively, the pick tool may be a vacuum-operable pick tool that utilizes suction to pick up the fastener.

According to an aspect of the invention, a pick tooling device includes a pick tool configured to pick up an object such as fastener, and a driver having a drive bit that is configured to drive the fastener, in which the drive bit is axially movable relative to the pick tool to engage and drive the fastener picked up by the pick tool.

According to another aspect of the invention, a pick tooling device includes: a pick tool having a housing that includes a vacuum chamber configured to provide sufficient suction to pick up an object, such as a fastener, at a suction orifice of the housing; and a driver having a drive bit extending along a longitudinal axis, the drive bit being movable within the housing along the longitudinal axis and configured to drive the object; wherein the drive bit is movable along the longitudinal axis between a first position, in which the drive bit is configured to be disengaged from the object, and a second position, in which the drive bit is configured to drivingly engage the object.

According to an embodiment of any paragraph(s) of this summary, the housing has a sealing surface for vacuum sealing a portion of the vacuum chamber; and wherein: in the first position the drive bit engages the sealing surface to vacuum seal the portion of the vacuum chamber, and in the second position the drive bit disengages from the sealing surface.

According to an embodiment of any paragraph(s) of this summary, the housing has an input port configured to receive the drive bit, and wherein the sealing surface is located proximal the input port.

According to an embodiment of any paragraph(s) of this summary, the sealing surface is provided by a bushing disposed at the input port.

According to an embodiment of any paragraph(s) of this summary, the drive bit has a first portion and a second portion at respective axial lengths of the drive bit, the first portion having a greater outer diameter about the longitudinal axis than an outer diameter of the second portion; and wherein: in the first position the outer diameter of the first portion of the drive bit engages the sealing surface to vacuum seal the portion of the vacuum chamber, and in the second position the outer diameters of both the first and second portions of the drive bit are disengaged from the sealing surface for reducing drag on the drive bit.

According to an embodiment of any paragraph(s) of this summary, in the first position the drive bit is spaced apart from the suction orifice in a direction of the longitudinal axis, and in the second position the drive bit extends through the suction orifice.

According to an embodiment of any paragraph(s) of this summary, the housing includes a nozzle portion having a nozzle end that defines the suction orifice, the nozzle portion having an internal fluid passage that fluidly connects the suction orifice to vacuum chamber; and wherein the nozzle portion is configured to pick up a specific object in a particular orientation.

According to an embodiment of any paragraph(s) of this summary, the pick tool includes a manifold having a fluid passage that fluidly connects the vacuum chamber to an output port that is configured to fluidly connect to a vacuum source.

According to an embodiment of any paragraph(s) of this summary, the pick tool is separable from the driver to interchange the pick tool with another pick tool while drive bit remains drivingly coupled to driver.

According to an embodiment of any paragraph(s) of this summary, the driver is operatively coupled to the pick tool via a tool changer having a first side coupled to the driver, a second side coupled to the pick tool, in which the first and second sides are coupled together at a coupling interface; and wherein the pick tool is separable from the driver via the tool changer such that the first side remains operably coupled to the driver, and the second side remains operably coupled to the pick tool.

According to an embodiment of any paragraph(s) of this summary, each of the first and second sides of the tool changer includes at least one port, the respective at least one port of each side being configured to fluidly connect together at the coupling interface for providing communication of the vacuum source with the vacuum chamber.

According to an embodiment of any paragraph(s) of this summary, the driver includes actuator.

According to an embodiment of any paragraph(s) of this summary, the actuator includes an electric motor having an output shaft that is rotatable about an axis, the drive bit being operatively coupled to and co-rotatable with output shaft for generating torque when driving the object.

According to an embodiment of any paragraph(s) of this summary, the pick tooling device further including a robot interface for operably coupling the pick tooling device to an automated robot.

According to an embodiment of any paragraph(s) of this summary, a pick tooling system includes the pick tooling device according to any embodiment(s) of this summary, and further includes a vacuum source.

According to an embodiment of any paragraph(s) of this summary, a pick tooling system includes the pick tooling device according to any embodiment(s) of this summary, and further includes a power source and/or an automated robot.

According to an embodiment of any paragraph(s) of this summary, a pick tooling system includes the pick tooling device according to any embodiment(s) of this summary, and further includes a controller configured to move the drive bit axially along the longitudinal axis relative to the housing.

According to another aspect of the invention, a pick tooling device includes: a pick tool having a pneumatically-operable gripper, the pneumatically-operable gripper including gripper jaws that are configured to selectively grip and pick up an object such as a fastener; and a driver operatively connected to the pick tool, the driver having a drive bit configured to drive the object; wherein the pick tool is separable from the driver to allow the pick tool to be interchanged with another pick tool while the drive bit remains drivingly coupled to the driver.

According to an embodiment of any paragraph(s) of this summary, the driver is operatively coupled to the pick tool via a tool changer having a first side coupled to the driver, a second side coupled to the pick tool, in which the first and second sides are removably coupled together via a coupling at a coupling interface between the first and second sides; and wherein the pick tool is separable from the driver via the tool changer such that the first side of the tool changer remains operably coupled to the driver, and the second side of the tool changer remains operably coupled to the pick tool.

According to another aspect of the invention, a method of picking up and driving a fastener with a pick tooling device, includes: inserting a drive bit of a driver of the pick tooling device through an input port in a housing of a pick tool of the pick tooling device, such that the drive bit engages a sealing surface of the housing and seals a portion of a vacuum chamber of the housing; drawing air through the vacuum chamber via a suction orifice of the housing; picking up a fastener via suction at the suction orifice; moving the drive bit within the housing along a longitudinal axis, such that the drive bit engages the fastener; and driving the drive bit to drive the fastener.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 4 is an enlarged cross-sectional side view of the pick tooling device shown in an exemplary state of moving the picked up fastener to a location for insertion into a component.

FIG. 5 is an enlarged cross-sectional side view of the pick tooling device shown in an exemplary state in which a drive bit of a driver of the device is moved axially relative to the pick tool to engage the fastener.

FIG. 6 is an enlarged cross-sectional side view of the pick tooling device shown in an exemplary state in which the drive bit begins to drive the fastener into the component.

FIG. 7 is an enlarged cross-sectional side view of the pick tooling device shown in an exemplary state in which the drive bit fully installs the fastener into the component.

FIG. 8 is an enlarged cross-sectional side view of the pick tooling device shown in an exemplary state in which the fastener is fully installed in the component and the pick tooling device is ready to pick another fastener.

FIG. 9 is an enlarged cross-sectional side view of the pick tooling device shown in an exemplary state in which the drive bit is withdrawn from the pick tool of the device.

FIG. 12 is a partially schematic view of a pick tooling system including a side view of an exemplary pick tooling device that is pneumatically-operable according to another embodiment of the invention.

FIG. 13 is a side view of the pick tooling device with the pneumatically-operable pick tool separated from the driver for interchanging with a different pneumatically-operable pick tool.

DETAILED DESCRIPTION

The principles and aspects of the present disclosure have particular application to pick tooling that is adapted to pick up and drive fasteners in an assembly process, such as a low-volume or medium-volume flexible feed process, and thus will be described below chiefly in this context. It is understood, however, that principles and aspects of this disclosure may be applicable to other systems for picking and driving other objects where it is desirable to improve process efficiencies, for example.

Figure 1:
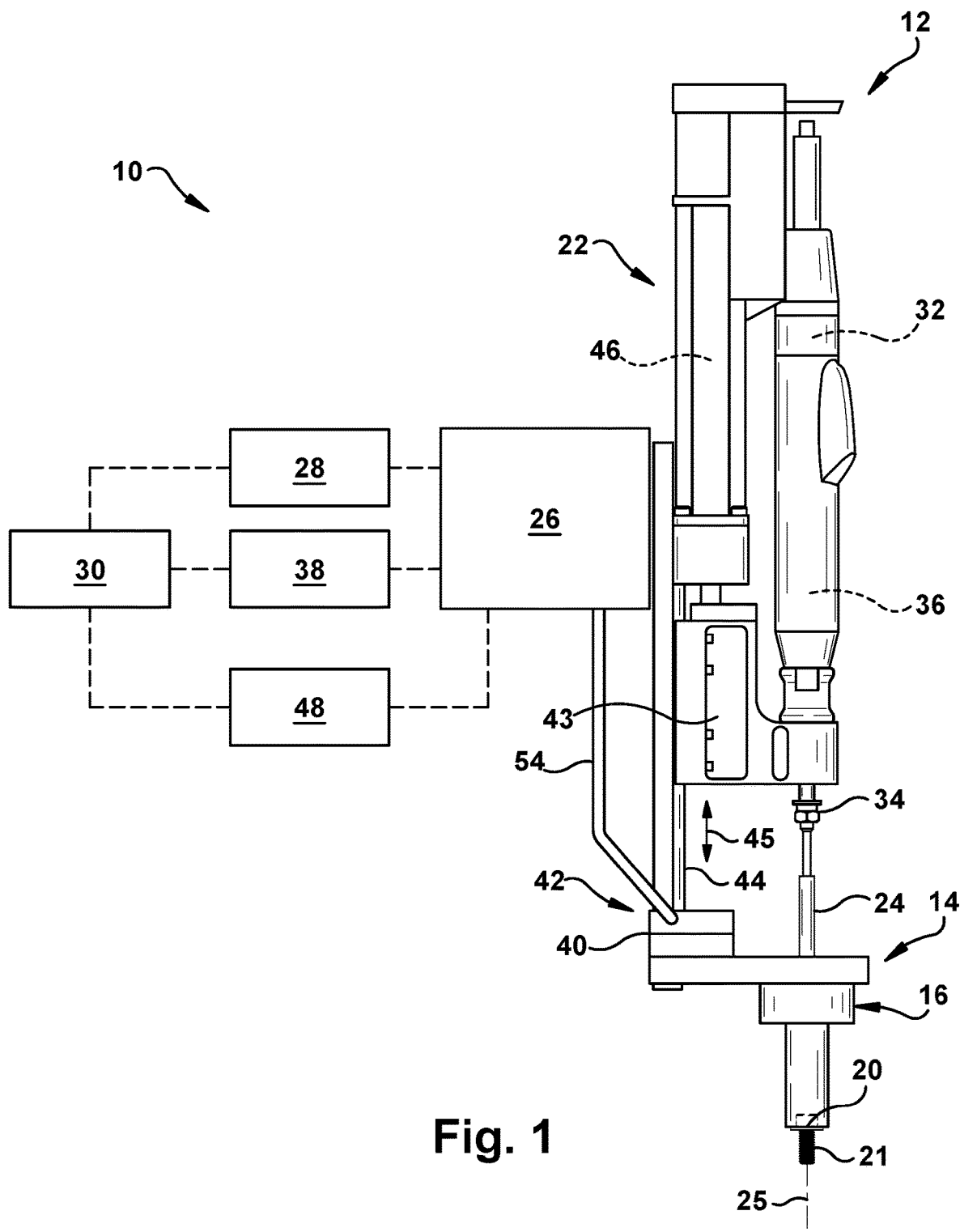
FIG. 1 is a partially schematic view of an exemplary pick tooling system including a side view of an exemplary pick tooling device that is operable with vacuum suction according to an embodiment of the invention.

Referring to FIG. 1, an exemplary pick tooling system 10 is shown including an exemplary pick tooling device 12. The pick tooling device 12 includes a pick tool 14 having a housing 16 that includes a vacuum chamber 18 (shown in FIG. 2), which is configured to provide suction at a suction orifice 20 of the pick tool 14 to suction grip and pick up an object, such as a fastener 21. The pick tooling device 12 also includes a driver 22 having a drive bit 24 that extends along a longitudinal axis 25. The drive bit 24 is movable within the housing 16 along the longitudinal axis 25 and is configured to engage and drive the picked up fastener 21. As will be discussed in further detail below, the drive bit 24 is movable along the longitudinal axis 25 between a first position in which the drive bit 24 is disengaged from the suction gripped fastener 21, and a second position in which the drive bit 24 is configured to drivingly engage the fastener 21.

The pick tooling system 10 may be utilized in an automated assembly process for picking objects, such as fasteners, for assembling one or more components of an assembly. For example, the pick tooling device 12 may be utilized in a flexible feed system for picking objects such as fasteners from a flexible feed tray. In exemplary embodiments, the pick tool 14 may be separable from the driver 22 to allow for interchangeability of the pick tool 14 for picking different types of fasteners, as will be discussed in further detail below. In this manner, such a pick tooling system 10 may be utilized in low-volume or medium-volume production lines where it may be desirable to have more flexibility in the ability to change between different fasteners types and sizes on-the-fly without significant interruption to the assembly process, thereby improving manufacturing efficiency. It is understood, however, that the pick tooling system 10 and device 12 may be utilized in other systems and/or for driving different types of objects other than fasteners. For example, the pick tooling device 12 may be utilized for picking objects such as studs for electrical leads that can be drivably inserted into a body of an electronic device. These examples are illustrative, and it is understood that the pick tooling system 10 and device 12 may be utilized for picking and driving any suitable object into any suitable substrate or component.

In exemplary embodiments, the pick tooling system 10 includes a robot interface 26 that is configured to operably connect the pick tooling device 12 to an automated robot 28. The robot 28 may be configured to move the pick tooling device 12 with three or more degrees of freedom along an x,y,z plane to pick the fasteners and locate them with respect to the component to be fastened. Optionally, the robot 28 may be equipped with a vision-guided system or other sensory feedback system to pick and place the fasteners or other objects. As shown, a system controller 30 may be operatively coupled to the robot 28 and is configured to control the robot movement in accordance with one or more sensory inputs and/or predefined computer instructions.

The driver 22 may be any suitable driver for the particular application. Generally, the driver 22 includes an actuator 32 (hidden from view) that is configured to drive the drive bit 24, which is thereby utilized to drive the fastener 21. In exemplary embodiments, the drive bit 24 is operatively coupled to the driver 22 via a coupling adapter 34, such as a chuck, which may allow for the drive bit 24 to be removed from the driver 22. The actuator 32 may be any suitable actuator for the driver 22, such as an electric, pneumatic, or hydraulic actuator, or the like, any of which may provide rotary and/or linear actuation of the drive bit 24. For example, the actuator 32 may be an electric actuator including a servomechanism or stepper motor. In the illustrated embodiment, the actuator 32 is a servomotor having an electric motor that rotationally drives an output shaft 36 (hidden from view). The output shaft 36 is connected to the drive bit 24 via the coupling adapter 34 which causes rotational motion of the drive bit 24 to generate torque on the fastener 21. Alternatively, the drive bit 24 could be integral and unitary with the output shaft 36. The servomotor may include one or more sensors, such as an encoder, that provides positional feedback for precise control of torque, velocity and/or angular position of the drive bit 24 and/or output shaft 36. As shown, the system 10 includes a power source 38 which is operatively coupled to the driver 22 such as via the robot 28 and/or robot interface 26. The controller 30 also may be operatively coupled to the power source 38 and/or the driver 22 such as via the robot interface 26. The controller 30 may be configured to control one or more parameters of the driver 22, such as speed, torque, position, etc. of the output shaft 36 and/or drive bit 24 in accordance with one or more sensory inputs and/or predefined computer instructions.

As shown, the driver 22 is operatively coupled to the pick tool 14 via a coupling interface 40. In the illustrated embodiment, the coupling interface 40 is formed by a tool changer 42 which is configured to allow the pick tool 14 to be interchanged with a different pick tool for picking different types of fasteners, as will be discussed in further detail below. Also as shown in the illustrated embodiment, the driver 22 may be operatively coupled to a slide 44. The slide 44 may include a channel or rail that interfaces with a carriage 43 of the driver 22. The carriage 43 may be operatively coupled to the output shaft 36 and drive bit 24. The carriage 43 may interface with an actuator 46, such as a linear actuator, that is configured to move the output shaft 36 and drive bit 24 up and down via the carriage 43. In the illustrated embodiment, this allows the drive bit 24 to move axially relative to the pick tool 14 (as shown with directional arrow 45), thereby allowing the drive bit 24 to move through the housing 16 and drive the fastener 21 which is picked up by the pick tool 14 as discussed below. The controller 30 may be operatively coupled to the actuator 46 such as via the robot interface 26 to control the axial movement of the drive bit 24 relative to the pick tool 14. In exemplary embodiments, the actuator 46 may be a servomotor on a lead screw, or may be a stepper motor or any other suitable actuator for linearly moving the output shaft 36 and drive bit 24 along the slide 44 via the carriage 43. It is understood, however, that other forms of axial movement may be provided for moving the output shaft 36 and/or the drive bit 24 relative to the pick tool 14, such as direct linear actuation of the drive bit 24 and/or the driver 22, for example.

Figure 2:
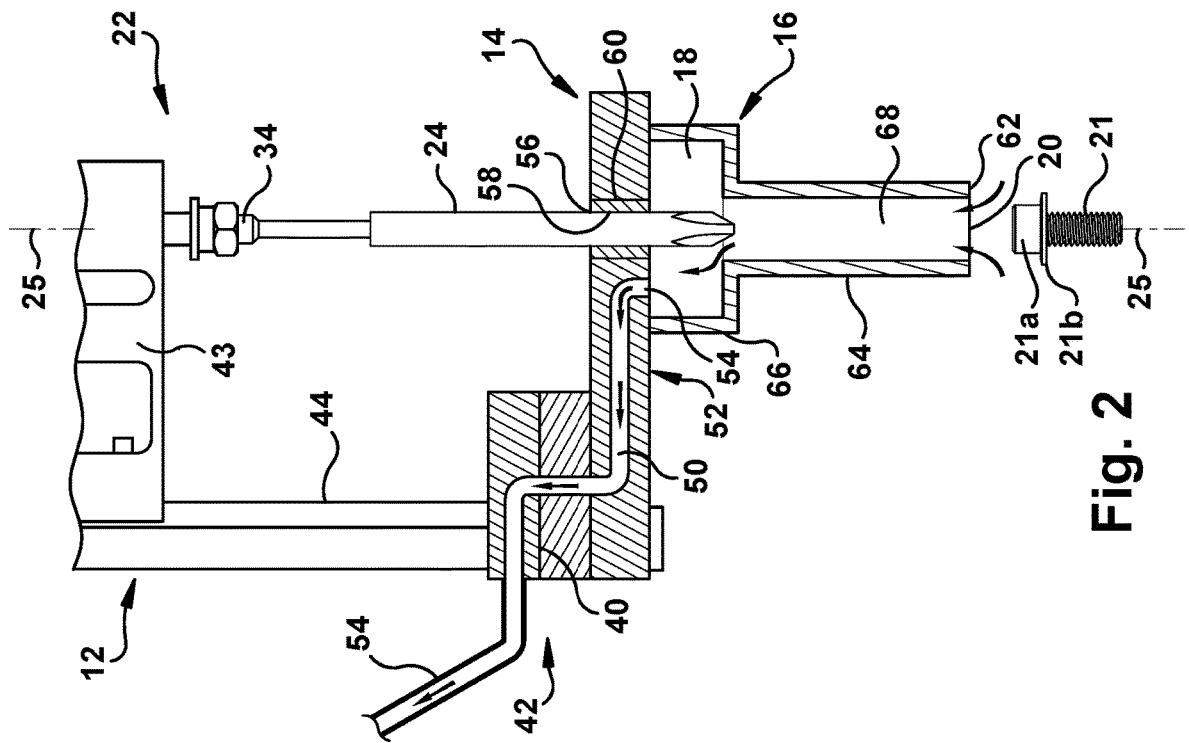
FIG. 2 is an enlarged cross-sectional side view of the pick tooling device shown in an exemplary state of causing suction through a suction orifice of a pick tool of the device for picking up a fastener.

Turning to FIGS. 2-8, the exemplary pick tool 14 and operation of picking the fastener 21 will be described in further detail. Referring initially to FIG. 2, the pick tooling device 12 is shown in a state in which the pick tool 14 is generating suction by drawing air through the vacuum chamber 18 via the suction orifice 20 of the housing 16 (as shown via the illustrated flow lines). In the illustrated embodiment, the vacuum chamber 18 is configured as a rigid enclosure that is defined by internal surfaces of the housing 16. The vacuum chamber 18 is fluidly connected to a vacuum source 48 (shown schematically in FIG. 1), which is configured to withdraw air from the vacuum chamber 18 to generate sufficient suction at the suction orifice 20 to pick up the fastener 21.

In exemplary embodiments, the vacuum source 48 includes a vacuum pump, which is fluidly connected to the vacuum chamber 18 via at least one fluid passage 50 that extends through a manifold 52 of the pick tool 14. In the illustrated embodiment, the fluid passage 50 is connected to an outlet 54 of the vacuum chamber 18 on one side of the passage 50, and the passage 50 extends through the coupling interface 40 to connect with a fluid conduit 54 at the opposite side of the fluid passage 50. As shown in the illustrated embodiment, the conduit 54 may be fluidly connected to the vacuum source 48 via the robot interface 26. Alternatively or additionally, the fluid conduit 54 may be directly ported from the vacuum source 48 to the fluid passage 50, or the conduit 54 may be directly ported to the vacuum chamber 18 through the housing 16. The controller 30 may be operably coupled to the vacuum source 48 to control operation thereof, which may include controlling one or more parameters associated with the degree of suction at the suction orifice 20, the pressure level in the vacuum chamber 18, when to selectively activate or deactivate suction, and the like.

Still referring to FIG. 2, the housing 16 of the pick tool 14 has an input port 56 that is configured to receive the drive bit 24, thereby allowing the drive bit 24 to move axially along the axis 25 within the housing 16 and through the vacuum chamber 18 (as shown in FIGS. 5-7, for example). In the illustrated state of FIG. 2, the drive bit 24 is shown in an exemplary first position (e.g., upward position) in which drive bit 24 is configured to be disengaged from the fastener 21 (e.g., axially spaced apart from the fastener 21 and/or from the suction orifice 20). As shown, the input port 56 is fluidly connected to the vacuum chamber 18, and the housing 16 includes a sealing surface 58 that is configured to be sealingly engaged by a portion of the drive bit 24 for sealing the fluid flow path between the input port 56 and the vacuum chamber 18 when the drive bit 24 is in the first position. In the illustrated embodiment, the sealing surface 58 is provided by a bushing 60, such as a plastic or elastomeric sleeve, that is inserted into the input port 56. It is understood, however, that the sealing surface 58 may be provided by other suitable sealing surfaces at other locations between the input port 56 and vacuum chamber 18 for engagement with the drive bit 24 to vacuum seal that portion of the vacuum chamber 18.

As shown in the illustrated state in FIG. 2, although the drive bit 24 sealingly engages the sealing surface 58 at the input port 56 of the housing 16, the suction orifice 20 is not closed to fluid flow such that air may be drawn through the orifice 20 and downstream through the vacuum chamber 18 to the vacuum source 48 via the fluid passage 50. As shown, the suction orifice 20 is defined by an opening in an end 62 of a nozzle portion 64 of the housing 16. The nozzle portion 64 extends from a main body portion 66 of the housing 16 that defines the vacuum chamber 18, and the nozzle portion 64 includes a fluid inlet passage 68 that fluidly connects the suction orifice 20 to the vacuum chamber 18. In exemplary embodiments, the nozzle portion 64 (also referred to as the nozzle 64) is configured such that the cross-sectional flow area of the fluid inlet passage 68 is relatively small compared to the flow area of the vacuum chamber 18, which may increase the velocity of fluid passing therethrough to generate a greater degree of suction at the orifice 20. The relatively small size of the nozzle 64 also may provide a smaller footprint for allowing the pick tool 14 to reach into smaller areas during the fastening process.

Figure 3:
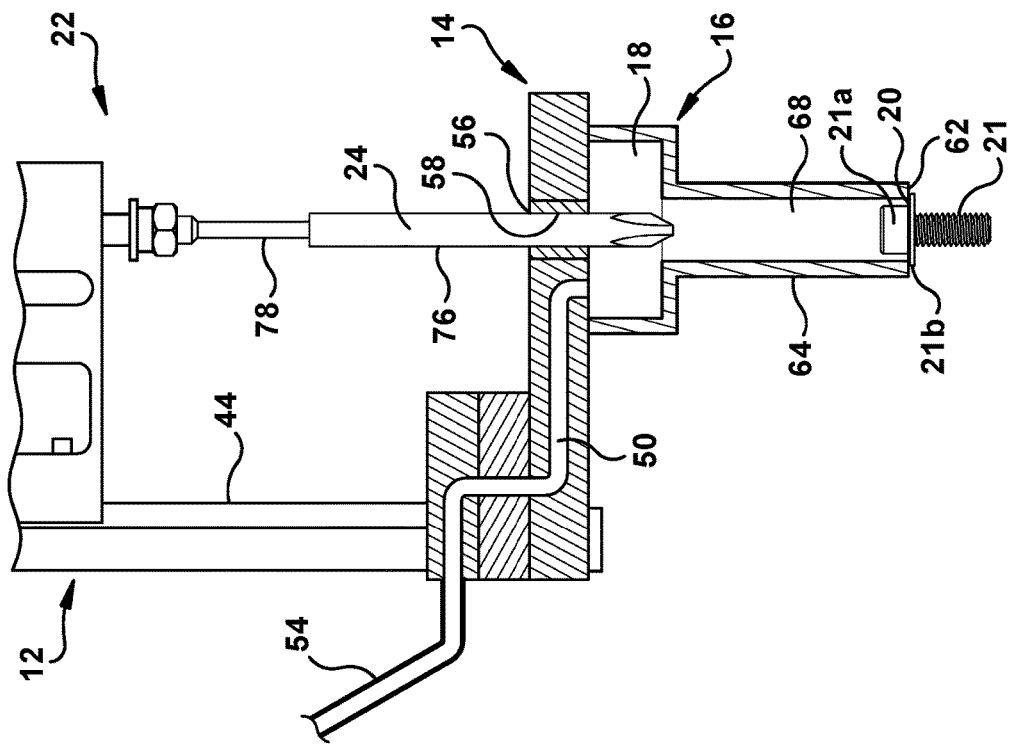
FIG. 3 is an enlarged cross-sectional side view of the pick tooling device shown in an exemplary state of picking up the fastener with the pick tool via a suction grip.

Turning to FIG. 3, the pick tooling device 12 is shown in a state in which the robot 28 guides the pick tool 14 toward the fastener 21, and when the nozzle 64 is passed near the fastener 21 to be picked, the airflow suction provided at the orifice 20 of the nozzle 64 suction grips the fastener 21. As discussed above, the vacuum pressure provided by the vacuum source 48 is configured to provide sufficient suction to pick up the fastener 21. The controller 30 may modify the degree of suction and/or the nozzle 64 may be specifically configured to cooperate with the vacuum source 48 to provide sufficient suction depending on the specific fastener to be picked. In exemplary embodiments, the nozzle 64 is specifically configured to suction grip the fastener 21 in a particular orientation, such as with a head side 21a of the fastener 21 being oriented upwards (as shown), thereby allowing proper placement and driving of the fastener 21 in the component.

In exemplary embodiments, the nozzle 64 may be specifically configured for specific type(s) of fastener(s). For example, the suction orifice 20 may have a particular cross-sectional shape that corresponds with the cross-sectional shape of the head 21a of the fastener 21, thereby enabling a suitable seal between the fastener 21 and the suction orifice 20. The improved sealability between the fastener 21 and the suction orifice 20 may improve the ability of the vacuum chamber 18 to be evacuated of air, thereby reducing pressure in the vacuum chamber 18 for enhancing the grip on the picked up fastener 21. For example, the fastener 21 may be a flanged hex head screw having a flange 21b and hexagonal shaped head 21a. In such a configuration, the nozzle 64 may be configured with a hexagonal shaped orifice 20 to receive the hexagonal shaped head 21a of the fastener 21 in a particular orientation, with the flange 21b of the fastener 21 engaging the nozzle end 62 to seal the suction orifice 20. It is understood that such a configuration of the pick tool 14 and fastener 21 is exemplary, and other suitable configurations of the pick tool 14 for different types of fasteners may be employed as would be understood by those having ordinary skill in the art.

Referring to FIG. 4, when the fastener 21 is picked up by the pick tool 14, the robot 28 (FIG. 1) may then move the pick tool 14 and fastener 21 to a component 69 that is intended to receive the fastener 21. For example, in the illustrated embodiment, the component 69 includes a fastening receiver 71, such as an opening in a substrate of the component 69, within which the fastener 21 is to be drivably inserted with the drive bit 24 of the driver 22.

Turning to FIG. 5, when the fastener 21 is in the desired location for insertion into the component 69, the drive bit 24 moves axially downward through the housing 16 to engage the head 21a of the fastener 21. In the illustrated state, the fastener 21 still maintains a suction seal with the end 62 of the nozzle 64 such that the fastener 21 remains suction gripped by the pick tool 14. The drive bit 24 includes a drive end portion 72 with a suitable drive interface 74 for mating with a corresponding receiver interface 75 of the fastener 21, which may include a Phillips-style, flat head-style, hexagonal-style, or any other suitable interface for drivingly engaging the fastener 21. In the illustrated state, the drive bit 24 may begin to rotate about its axis 25 to align the drive interface 74 of the drive end portion 72 with the receiver interface 75 of the fastener 21, and the fastener 21 may begin to rotate and begin insertion (e.g., via threading) into the component 69.

Referring to FIGS. 6 and 7, the driving of the fastener 21 into the component 69 by the drive bit 24 is shown in further detail. As shown, the drive bit 24 is moved axially downward along the axis 25 through the housing 16 to an exemplary second position (shown in FIG. 6, for example) whereupon the drive bit 24 forces the fastener 21 away from the suction orifice 20 and into the component 69. In the illustrated embodiment, the drive bit 24 is operatively coupled to the output shaft 36 (hidden from view) of the driver 22, which rotates and applies torque to the fastener 21 as it is driven (e.g., threaded) into the component 69.

In exemplary embodiments, the drive bit 24 is configured to extend through the suction orifice 20 in the exemplary second position, such that the drive end portion 72 of the drive bit 24 extends beyond the nozzle end 62. This allows the fastener 21 to be driven into the component 69 with the nozzle end 62 being spaced apart from the component 69, which may help to prevent damage to the component. In addition, by allowing the drive bit 24 to extend axially beyond the nozzle end 62, the fastener 21 may be driven into the component 69 without the nozzle 64 contacting the fastener 21, which may help to reduce drag on the fastener 21, thereby improving torque accuracy during driving of the fastener 21. As shown in FIG. 7, the drive bit 24 may continue to move axially downward to a position below the exemplary second position until the fastener 21 is completely secured (e.g., threaded) in the component 69.

As discussed above, the exemplary pick tooling device 12 is configured to seal the input port 56 of the housing 16 by having the drive bit 24 sealingly engage the sealing surface 58 when the drive bit 24 is in the exemplary first (sealing) position (as shown in FIGS. 3 and 4, for example). In addition, the exemplary pick tooling device 12 is also configured to have the drive bit 24 disengage from the sealing surface 58 when the drive bit 24 is in the exemplary second (driving) position (as shown in FIG. 6, for example), or positions beyond the second position (as shown in FIG. 7, for example). Such a configuration allows the drive bit 24 to be utilized to seal a portion of the vacuum chamber 18 via engagement with the sealing surface 58 when in the first position, while minimizing drag on the drive bit 24 during driving of the fastener 21 via disengagement with the sealing surface 58 when in the second position. Such a reduction in drag on the drive bit 24 improves torque accuracy during fastener installation, particularly when applying a final desired torque load to the fastener 21 when fully installed in the component 69 (as shown in FIG. 7, for example). Such a configuration also reduces the number of parts for sealing the vacuum chamber 18 by utilizing the drive bit 24 to create the seal at the input port 56.

As shown in the illustrated embodiment, the drive bit 24 may have a first larger diameter portion 76 and a second smaller diameter portion 78 at respective axial lengths of the drive bit that facilitate engagement and disengagement with the sealing surface 58 as the drive bit 24 moves axially between the first (sealing) and second (driving) positions. Referring to FIG. 3, for example, when the drive bit 24 is in the first (sealing) position (e.g., spaced apart from the suction orifice 20 and/or fastener 21), the outer surface of the larger outer diameter portion 76 sealingly engages the sealing surface 58 to seal the vacuum chamber 18 as discussed above. When the drive bit 24 is moved to the second (driving) position (e.g., extending through the suction orifice 20 and drivingly engaging the fastener 21) as shown in FIG. 6, for example, the outer surface of the smaller diameter portion 78 is spaced from the sealing surface 58 to form an annular gap therebetween, which reduces drag on the drive bit 24 as discussed above. Although such disengagement with the sealing surface 58 breaks the vacuum seal at the input port 56, and thus the suction grip at the suction orifice 20, the drive end portion 72 of the drive bit 24 in the illustrated state is configured to hold the fastener 21 in place on the component 69 prior to losing the suction grip (as shown in the comparison between FIGS. 5 and 6, for example). As shown in FIG. 7, the smaller diameter portion 78 of the drive bit remains disengaged from the sealing surface 58 as the drive bit 24 moves axially downward to fully install (e.g., thread) the fastener 21 into the component 69, such that the desired final torque to be applied to the fastener 21 is not impacted by contact of the drive bit 24 with the sealing surface 58.

Turning to FIG. 8, after the fastener 21 has been installed in the component 69, the drive bit 24 may return to the exemplary first position to again form the vacuum seal with the sealing surface 58, thereby providing sufficient suction at the suction orifice 20. The pick tooling device 12 is then ready to pick another object, and the process may repeat.

As shown in FIG. 9, the drive bit 24 also may be moved axially upward in the illustrated embodiment to withdraw the drive bit 24 from the housing 16. This may allow for changeover of the drive bit 24 to another drive bit of either the same or different type while the pick tool 14 remains coupled to the driver 22 via the coupling interface 40.

Figure 10:
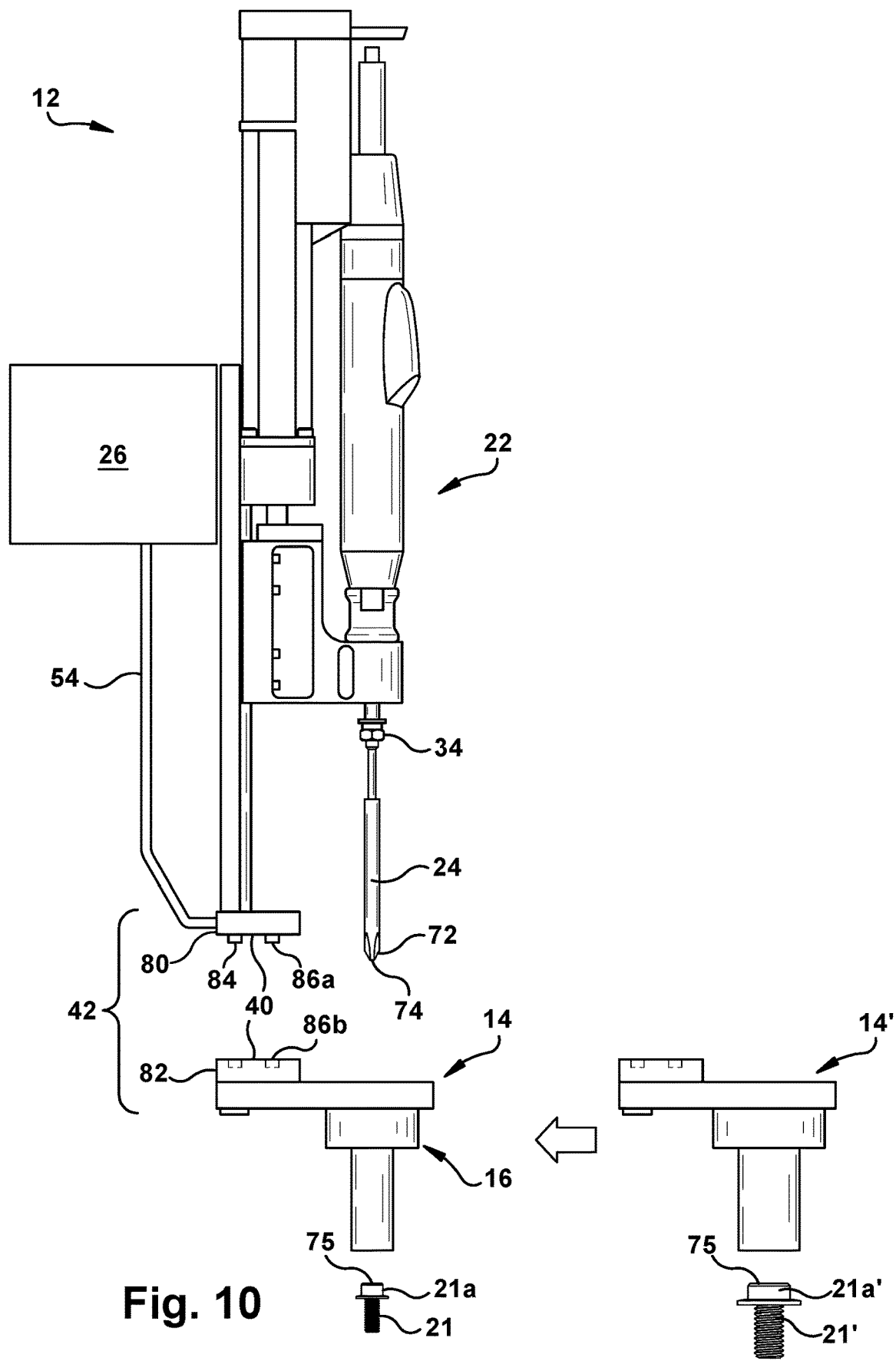
FIG. 10 is a side view of the pick tooling device with the pick tool separated from the driver for interchanging with a different pick tool.

Referring to FIG. 10, when the drive bit 24 is withdrawn from the housing 16 of the pick tool 14, the pick tool 14 also may be separated from the driver 22 to allow for changeover of the pick tool 14 to another pick tool 14' of either the same or different type, such as for picking a different specific type of fastener 21'. In exemplary embodiments, the drive bit 24 remains drivingly coupled to the driver 22, such as via the coupling adapter 34, while the pick tool 14 is changed. This may allow for the same drive bit 24 to be used with the different type of fastener 21' to be picked by the different pick tool 14' that was interchanged with the pick tool 14. For example, the different type of fastener 21' may have a larger head 21a' and/or a different head configuration than the fastener 14 (e.g., a 12-point configuration instead of a hexagonal configuration, for example), which the fastener-specific pick tool 14' is configured to pick. Meanwhile, the different fastener 21' may have the same receiver interface 75 for mating with the drive interface 74 of the drive end portion 72 of the drive bit 24 (e.g., both fasteners 21 and 21' may have the same Phillips-style interface, for example). Such a configuration may minimize the amount of changeover and parts required for the assembly process, which may improve process efficiencies.

In exemplary embodiments, the pick tool 14 is automatically changed by a robot via the tool changer 42, which may be based upon computer instructions from the controller 30 to pick the different fastener 21', for example. As shown, the tool changer 42 may have a first (master) side 80 that remains operably coupled to the driver 22, a second (slave or tool) side 82 that remains operably coupled to the pick tool 14, in which the first and second sides 80, 82 are removably coupled together at the coupling interface 40. A coupling 84, such as a quick coupling having a ball and sleeve locking mechanism, may be provided at the interface 40 between the first and second sides 80, 82 to allow for quick changeover of the pick tool 14. In addition, each of the first and second sides 80, 82 may have one or more corresponding ports 86a, 86b configured to be connected together for providing communication of the vacuum source 48 with the vacuum chamber 18 (and/or with additional ports for providing pneumatic communication for use with a pick tool having pneumatic function, as discussed below).

Figure 11:
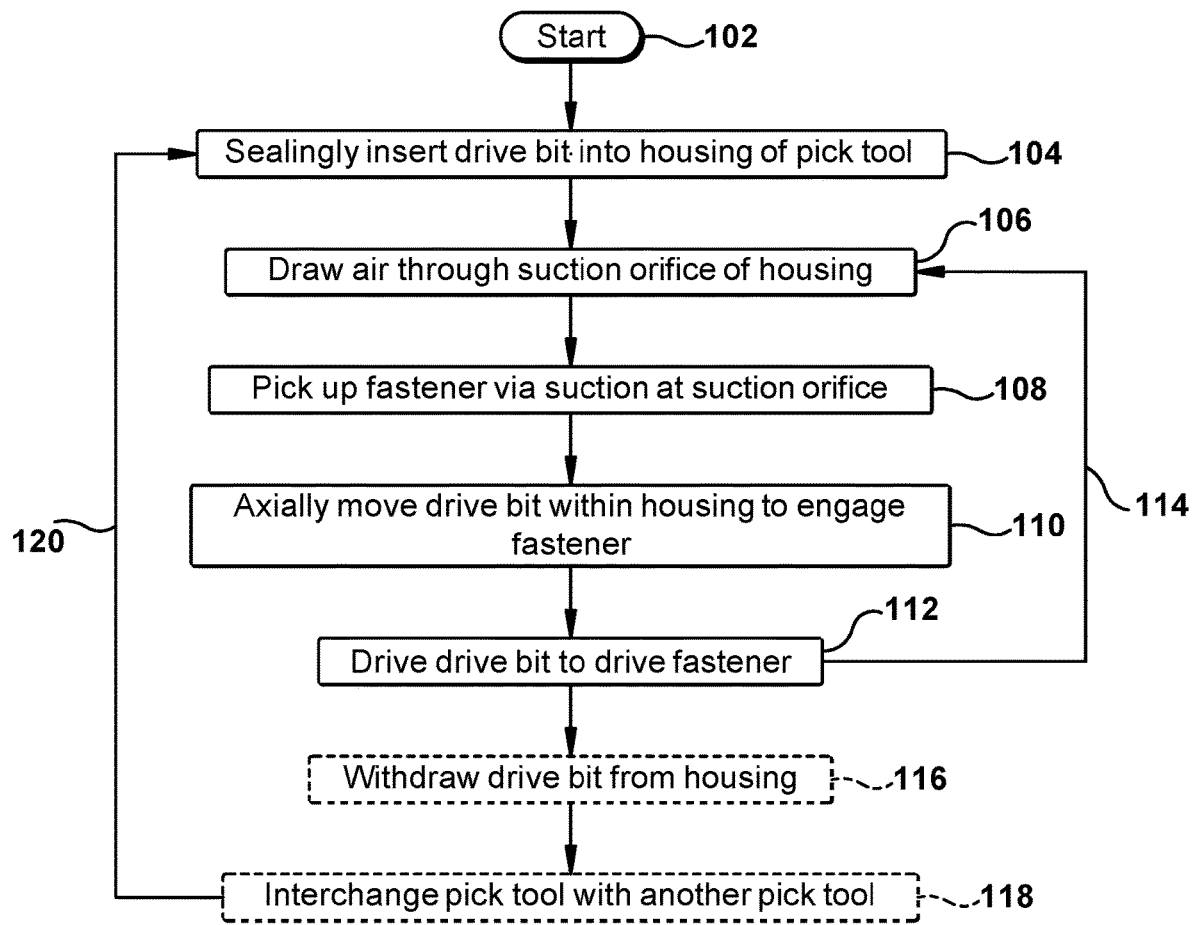
FIG. 11 is a flow chart showing an exemplary method of picking up and driving a fastener with the pick tooling device.

Referring to FIG. 11, a flow chart showing an exemplary method 100 of picking up and driving a fastener with the exemplary pick tooling device 12 is shown. At step 102, the process begins, such as by providing the exemplary pick tooling device and a plurality of objects such as fasteners. At step 104, the drive bit of the driver of the pick tooling device is inserted through the input port in a housing of the pick tool, such that the drive bit engages the sealing surface of the housing and seals a portion of the vacuum chamber of the housing. At step 106, air is drawn through the vacuum chamber via the suction orifice of the housing. At step 108, a fastener is picked up via suction at the suction orifice. At step 110, the drive bit is moved within the housing along a longitudinal axis, such that the drive bit engages the fastener that is gripped by vacuum suction at the suction orifice. At step 112, the drive bit is driven by the driver to drive the fastener. At step 114, the process may repeat. Optionally, at step 116, the drive bit may be withdrawn from the housing. Optionally, at step 118, the pick tool may be interchanged with another pick tool. At step 120, the process may repeat with the different pick tool.

Turning to FIGS. 12 and 13, another exemplary embodiment of a pick tooling system 210 and pick tooling device 212 are shown. The pick tooling system 210 and device 212 are substantially similar to the above-referenced pick tooling system 10 and device 12, and consequently the same reference numerals but indexed by 200 are used to denote structures corresponding to similar structures. In addition, the foregoing description of the pick tooling system 10 and device 12 are equally applicable to the pick tooling system 210 and device 212, except as noted below. Moreover, it is understood that aspects of the pick tooling systems 10, 210 and devices 12, 212 may be substituted for one another or used in conjunction with one another where applicable.

In the embodiment shown in FIGS. 12 and 13, the pick tooling device 212 includes a pick tool 214 with a pneumatically-operable gripper instead of the vacuum-operable gripper of the pick tool 14 shown in FIGS. 1-11. In exemplary embodiments, the pneumatically-operable gripper includes gripper jaws 216 that are configured to selectively open and close to grip and pick up an object, such as a specific fastener 221. Similarly to the above-described pick tooling device 12, the driver 222 and/or drive bit 224 of the pick tooling device 212 is axially movable relative to the gripper jaws 216 to engage and drive the fastener 221 into a component, for example. The drive bit 224 also may be retractable from the pick tool 214 to allow for changeover of the drive bit 224 to another drive bit of either the same or different type while the pick tool 214 remains coupled to the driver 222 such as via a coupling interface 240 (as shown in FIG. 13, for example).

Similarly to the above-described pick tooling device 12, the coupling interface 240 of the pick tooling device 212 may be formed by a tool changer 242 which allows for the pick tool 214 to be separated from the driver 222 (as shown in FIG. 13) for interchanging the pick tool 214 with another pick tool. In exemplary embodiments, the drive bit 224 remains drivingly coupled to the driver 222, such as via the coupling adapter 234, while the pick tool is changed. This allows for the same drive bit 224 to be used with the different type of fastener to be picked by the different pneumatically-operable pick tool (not shown) that was interchanged with the pneumatically-operable pick tool 214. Similarly to the above-describe pick tool 14, the pick tool 214 may be automatically changed by a robot via the tool changer 242. A coupling 284, such as a quick coupling, may be provided between the first (master) 280 and second (tool) 282 sides of the tool changer 242 to facilitate quick changeover of the pick tool 214.

As shown, the pneumatically-operable pick tool 214 may include one or more pneumatic passages 251 for communicating pressurized gas to operate the gripper jaws 221. In the illustrated embodiment, two pneumatic passages 251 are provided that may be utilized independently to selectively open and close the gripper jaws 221 in a well-known manner. The passages 251 may extend through the first (master) 280 and second (tool) 282 sides of the tool changer 242, and the respective sides 280, 282 may have one or more corresponding ports 286a, 286b configured to be connected together for providing communication of a fluid power source 249 (e.g., air compressor) with the pneumatic operation of the gripper jaws 221. As shown, the passages 251 may include conduits, which may be connected to the fluid power source 249 via the robot interface 226, and which may be controlled via the controller 230. Also as shown, the pick tooling device 212 may include a vacuum passage 250, including conduit(s), that are connectable to a vacuum source 248, similarly to the above-described pick tooling device 12. The vacuum passage 250 may be fluidly connected via porting through the first (master) side 280 of the tool changer 242 to enable connection to the vacuum-operable pick tool 14 described above. In this manner, the same driver 222 may be utilized for both the pneumatically-operable pick tool 214 and the vacuum-operable pick tool 14.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

As used herein an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. An "operable connection," or a connection by which entities are "operably connected," also may be one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

It is understood that embodiments of the subject matter described in this specification can be implemented in combination with digital electronic circuitry, controllers, processors, computer software, firmware, and/or hardware. For example, embodiments may be implemented in a pick tooling system that uses one or more modules of computer program instructions encoded on a non-transitory computer-readable medium for execution by, or to control the operation of, data processing apparatus.

In the flow diagram(s), blocks may denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

Algorithmic descriptions and representations used herein are the means used by those skilled in the art to convey the substance of their work to others. An algorithm or method is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities.

Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities. It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method. The computer-readable medium may be a hard-drive, a machine-readable storage device, a memory device, or a combination of one or more of them.

The controller may include all apparatus, devices, and machines for processing data, including by way of example a programmable processor, a computer, or multiple processors or computers. The controller may include, in addition to hardware, code that creates an execution environment for the computer program in question. The computer program (also referred to as software or code), may be deployed in any form, including as a stand-alone program or as a module, component, subroutine, or other unit suitable for use in a computing environment. The computer program may be deployed to be executed on one computer or on multiple computers that are located at one site or distributed across multiple sites and interconnected by a communication network. The processor may include all apparatus, devices, and machines suitable for the execution of a computer program, which may include, by way of example, both general and special purpose microprocessors, and any one or more processors of any kind of digital computer. Generally, the processor will receive instructions and data from a read-only memory or a random access memory or both. The computer may include, or be operatively coupled to receive data from or transfer data to, or both, one or more mass storage devices for storing data. Devices suitable for storing computer program instructions and data include all forms of non-volatile memory, media and memory devices, including by way of example semiconductor memory devices. The processor and the memory can be supplemented by, or incorporated in, special purpose logic circuitry.

To provide for interaction with a user, embodiments may be implemented using a computer having a display device and an input device. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Embodiments may include a computing system that includes a back-end component (e.g., as a data server), or that includes a middleware component (e.g., an application server), or that includes a front-end component (e.g., a client computer having a graphical user interface through which a user can interact with an implementation of the subject matter described is this specification), or any combination of one or more such back-end, middleware, or front-end components. The components of the system can be interconnected by any form or medium of digital data communication.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A pick tooling device, comprising:
    a pick tool having a housing that includes a vacuum chamber configured to provide sufficient suction to pick up an object at a suction orifice of the housing; and
    a driver having a drive bit extending along a longitudinal axis, the drive bit being movable within the housing along the longitudinal axis and configured to drive the object;
    wherein the drive bit is movable along the longitudinal axis between a first position, in which the drive bit is configured to be disengaged from the object, and a second position, in which the drive bit is configured to drivingly engage the object;
    wherein the housing has a sealing surface for vacuum sealing a portion of the vacuum chamber; and
    wherein: in the first position the drive bit engages the sealing surface to vacuum seal the portion of the vacuum chamber, and in the second position the drive bit disengages from the sealing surface.

2. The pick tooling device according to claim 1, wherein the housing has an input port configured to receive the drive bit, and wherein the sealing surface is located proximal the input port.

3. The pick tooling device according to claim 2, wherein the sealing surface is provided by a bushing disposed at the input port.

4. The pick tooling device according to claim 1,
wherein the drive bit has a first portion and a second portion at respective axial lengths of the drive bit, the first portion having a greater outer diameter about the longitudinal axis than an outer diameter of the second portion; and
wherein: in the first position the outer diameter of the first portion of the drive bit engages the sealing surface to vacuum seal the portion of the vacuum chamber, and in the second position the outer diameters of both the first and second portions of the drive bit are disengaged from the sealing surface for reducing drag on the drive bit.

5. The pick tooling device according to claim 1, wherein: in the first position the drive bit is spaced apart from the suction orifice in a direction of the longitudinal axis, and in the second position the drive bit extends through the suction orifice.

6. The pick tooling device according to claim 1,
wherein the housing includes a nozzle portion having a nozzle end that defines the suction orifice, the nozzle portion having an internal fluid passage that fluidly connects the suction orifice to vacuum chamber; and
wherein the nozzle portion is configured to pick up a specific object in a particular orientation.

7. The pick tooling device according to claim 1, wherein the pick tool includes a manifold having a fluid passage that fluidly connects the vacuum chamber to an output port that is configured to fluidly connect to a vacuum source.

8. The pick tooling device according to claim 1, wherein the pick tool is separable from the driver to interchange the pick tool with another pick tool while drive bit remains drivingly coupled to driver.

9. The pick tooling device according to claim 1,
wherein the driver is operatively coupled to the pick tool via a tool changer having a first side coupled to the driver, a second side coupled to the pick tool, in which the first and second sides are coupled together at a coupling interface; and
wherein the pick tool is separable from the driver via the tool changer such that the first side remains operably coupled to the driver, and the second side remains operably coupled to the pick tool.

10. The pick tooling device according to claim 9, wherein each of the first and second sides of the tool changer includes at least one port, the respective at least one port of each side being configured to fluidly connect together at the coupling interface for providing communication of the vacuum source with the vacuum chamber.

11. The pick tooling device according to claim 1, wherein the driver includes actuator.

12. The pick tooling device according to claim 11, wherein the actuator includes an electric motor having an output shaft that is rotatable about an axis, the drive bit being operatively coupled to and co-rotatable with output shaft for generating torque when driving the object.

13. The pick tooling device according to claim 1, further including a robot interface for operably coupling the pick tooling device to an automated robot.

14. A pick tooling system having the pick tooling device according to claim 1, and further including a vacuum source.

15. A pick tooling system having the pick tooling device according to claim 1, and further including a power source and/or an automated robot.

16. A pick tooling system having the pick tooling device according to claim 1, and further including a controller configured to move the drive bit axially along the longitudinal axis relative to the housing.

17. A pick tooling device, comprising:
a pick tool having a pneumatically-operable gripper, the pneumatically-operable gripper including gripper jaws that are configured to selectively grip and pick up an object; and
a driver operatively connected to the pick tool, the driver having a drive bit configured to drive the object;
wherein the pick tool is separable from the driver to allow the pick tool to be interchanged with another pick tool while the drive bit remains drivingly coupled to the driver;
wherein the driver is operatively coupled to the pick tool via a tool changer having a first side coupled to the driver, a second side coupled to the pick tool, in which the first and second sides are removably coupled together via a coupling at a coupling interface between the first and second sides; and
wherein the pick tool is separable from the driver via the tool changer such that the first side of the tool changer remains operably coupled to the driver, and the second side of the tool changer remains operably coupled to the pick tool.

18. A method of picking up and driving a fastener with a pick tooling device, comprising:
inserting a drive bit of a driver of the pick tooling device through an input port in a housing of a pick tool of the pick tooling device, such that the drive bit engages a sealing surface of the housing and seals a portion of a vacuum chamber of the housing;
drawing air through the vacuum chamber via a suction orifice of the housing;
picking up a fastener via suction at the suction orifice;
moving the drive bit within the housing along a longitudinal axis, such that the drive bit engages the fastener; and
driving the drive bit to drive the fastener.

* * * * *